United States Patent [19]

Suter

[11] Patent Number: 4,788,786

[45] Date of Patent: Dec. 6, 1988

[54] ARTICLE TRANSPORTING AND RAISING AND LOWERING APPARATUS

[75] Inventor: Hans R. Suter, Wangen, Switzerland

[73] Assignee: Roag (AG), Switzerland

[21] Appl. No.: 42,931

[22] Filed: Apr. 27, 1987

[30] Foreign Application Priority Data

Apr. 25, 1986 [CH] Switzerland .................. 1712/86

[51] Int. Cl.$^4$ .................................. B08B 3/04
[52] U.S. Cl. .................................. 134/56 R; 134/61;
134/73; 134/124; 118/425; 198/346.3
[58] Field of Search .................. 118/425; 198/346.3;
134/73, 70

[56] References Cited

U.S. PATENT DOCUMENTS

| | | | |
|---|---|---|---|
| 1,434,859 | 11/1922 | Taylor | 198/346.3 |
| 2,997,191 | 8/1961 | Finston | 198/346.3 X |
| 3,022,881 | 2/1962 | Harper et al. | 134/76 X |
| 3,088,610 | 5/1963 | Pianowski | 198/346.3 X |
| 3,106,927 | 10/1963 | Madwed | 137/76 |
| 3,760,927 | 9/1973 | Zambon | 198/346.3 |
| 3,888,270 | 6/1975 | Crapet | 134/76 X |
| 4,331,230 | 5/1982 | Buckley | 198/346.3 |

Primary Examiner—Harvey C. Hornsby
Assistant Examiner—Frankie L. Stinson
Attorney, Agent, or Firm—Ostrolenk, Faber, Gerb & Soffen

[57] ABSTRACT

A transport apparatus for moving a plurality of article transport devices into and out of a plurality of stations includes an endless band conveyor which moves above the stations, a plurality of article transport devices being supported on and moved by the conveyor past the stations, a first motor connected with the conveyor for moving the conveyor to move the article transport devices to each of the stations in turn, a second motor connected with the entire conveyor apparatus for raising and lowering it thereby to move the transport devices and the articles they support at each station into and out of the stations for treatment, and a common control unit connected with the motors for moving the conveyor past the stations and for moving the conveyor up and down and for coordinating these operations. The conveyor itself comprises a pair of parallel endless bands on which the transport devices are supported and are moved.

15 Claims, 3 Drawing Sheets

ARTICLE TRANSPORTING AND RAISING AND LOWERING APPARATUS

BACKGROUND OF THE INVENTION

The present invention relates to apparatus for transporting articles to a series of workstations and for raising and lowering the articles into and out of the individual workstations. This apparatus includes at least one belt conveyor which moves the articles past a series of workstations and means for moving the articles into and out of the workstations, as well as means for controlling these operations. The apparatus of the invention is useful for operations performed upon ultrasonic and/or processing units, and the apparatus may include stations for performing various functions on the articles, including stations at which the articles are dipped into vats or containers of appropriate processing liquids or materials and may also include drawing stations.

One existing article transport apparatus includes transport units that move along tracks that are above and/or behind the apparatus. For conveying the articles along the tracks, the apparatus may include article transport means such as a basket. Further, the apparatus may be fitted with a lifting mechanism associated with the basket for raising and lowering the articles to be operated upon. The articles to be operated upon are transported to a number of stations in sequence for respective treatments to be performed. The articles are then inserted into the individual stations for the respective treatments and are withdrawn from the stations to be transported to the next stations for further processing.

In another known article transport apparatus, the baskets for transporting the articles are fed or transported from workstation to workstation over a roller track using a single lifting girder device.

Known transport apparatus sometimes have the disadvantage that they require too much space. Because the transport apparatus may pass over or above the individual work stations, requirements for cleanliness of the articles being operated upon and/or of the workstations, which may include open-top vats, often cannot be satisfied. Therefore, setting up such equipment under clean room conditions may be accomplished only at great expense. Furthermore, in some known apparatus, the transportation means must be changed or transferred during conveyance. This may knock or bang the articles being transported and their transport carriers, which is undesirable, especially with precision goods as in precision optics supplies.

SUMMARY OF THE INVENTION

The primary object of the present invention is to provide transport apparatus which overcomes the above-mentioned disadvantages and which is simple in structure and in operation.

Another object of the invention is to enable articles to be readily transported from workstation to workstation and to be moved into and out of each workstation.

According to the invention, the article transport apparatus automatically feeds articles along a path from an entrance to an exit past a number of consecutive workstations. The apparatus includes at least one and may include a greater number of conveyors which may move along a path and parallel to one another. The conveyor is driven by a first driving unit. The conveyor, which may be in the form of a belt or band, is disposed at a predetermined height with respect to the workstations for transporting the articles to be treated above the stations and for halting the article transport at each of the stations. Means are provided for selectively lifting the entire halted conveyor up and down in relation to the stations for thereby moving all of the supported article transport devices and the articles into and out of the stations. Transport or carrier devices for the articles are applied to the conveyor before the first processing station and are removed from the conveyor after the last processing station. A control unit controls the conveyor depending upon the distance of travel of the article transport devices along the path of the conveyor for lacing the articles at the stations for being lifted. Sensors determine when a transport device is at a station. The stations are uniformly spaced so that articles are treated in the stations each time the conveyor is halted.

The conveyor includes travel rails which are connected to the lifting mechanism which raises and lowers the rails, and the conveyor comprises bands which pass along the rails and in turn support the article transport devices, whereby the rails, the endless bands and the supported, article transport devices move up and down with the lifting mechanism. Appropriate sensors of the positions of the transport devices transmit signals to the control unit for halting the movement of the endless bands and for subsequently operating the lifting mechanism. The driving unit for the conveyor and the driving unit for the lifting mechanism may be combined into a common operating unit.

The advantages achieved with the invention lie mainly in that the transport system has been integrated into the equipment itself and can be controlled by the control system of that equipment. The equipment, including the transport system, can be set up without problems due to room or space confinement and cleanliness, and it can be made to have a high production capacity.

Other objects and features of the invention can be understood from the following description and accompanying drawings.

DESCRIPTION OF PREFERRED EMBODIMENTS

Figure 1:
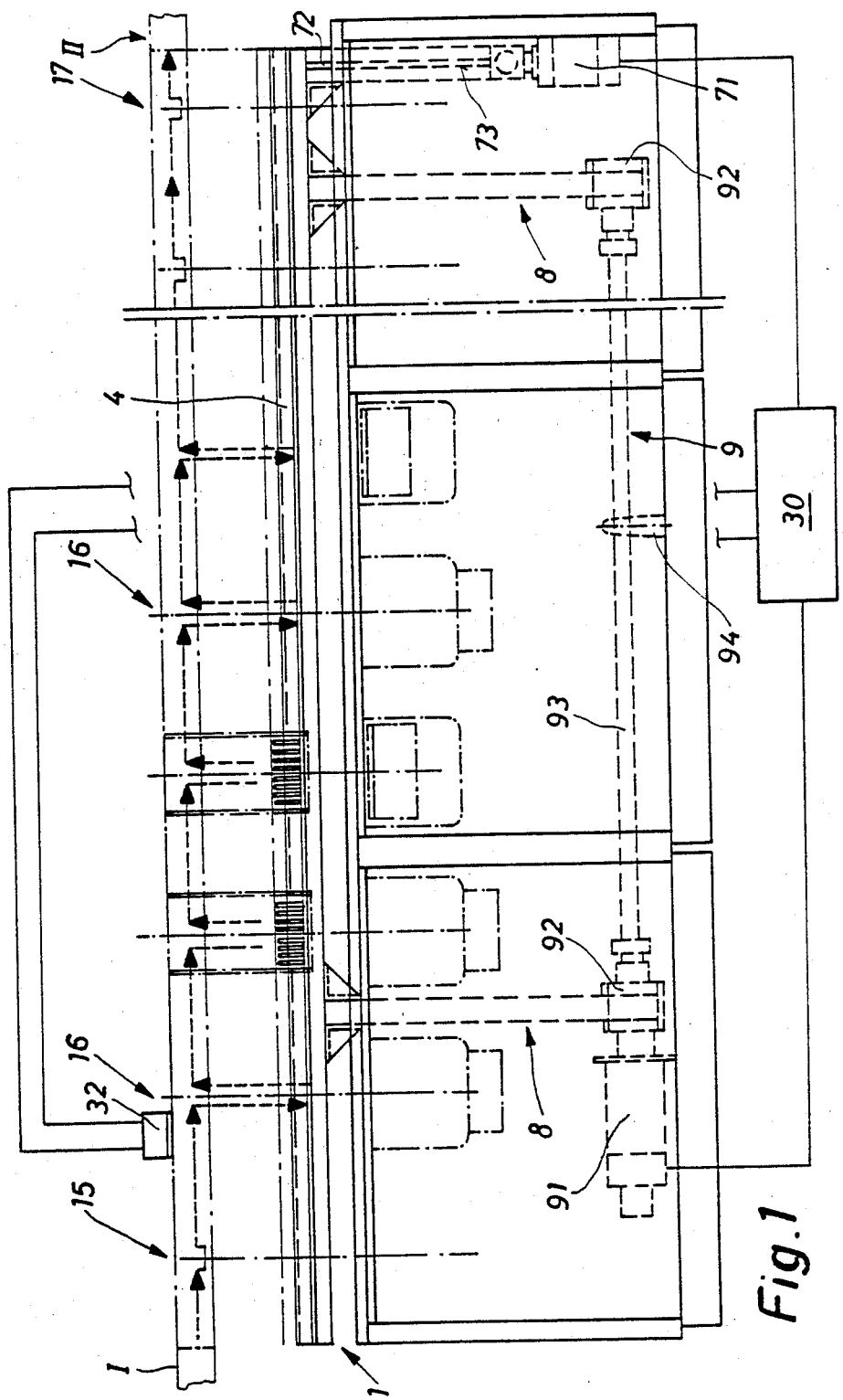
FIG. 1 is a schematic view of transport apparatus according to the invention.

The two embodiments of article transport apparatus in FIGS. 1-5, for example, be part of an ultrasonic processing unit for cleaning and drying of articles. However, there is no required application for the apparatus, and it may be used for any purposes consistent with the operation described.

The apparatus comprises at least one conveyor 1. The apparatus may alternately have a plurality of these conveyors arranged side-by-side, for example. The conveyor comprises a pair of rails 4 which are parallel, spaced apart, and extend along the length of the housing 20 for guiding motion of the article transport devices 2, as described below.

Each of the two rails 4, has a substantially flat upper surface 4a with an upright portion 4b. Guided and supported on top of the upper surface 4a of each rail there is a continuous, endless belt 6 which has a run that is accessible from above the band 6. There is disposed at each of the rails 4 at least one drive roller 41 which is driven to rotate by a motor connected to the roller by gear means (not shown). That motor may be disposed between the rails 4 or otherwise, as desired. The drive roller 41 has wrapped around it the endless band or belt 6 and the roller 41 drives that belt over the rail 4. The endless band 6 may be driven to slide over the rails 4. In the alternative, each rail 4 may have a row of fixed position, freely rotatable rollers 41 disposed above it on which the respective endless band 6 freely moves, and the motor may drive one of those rollers to move the band over the other rollers.

There is at least one and more usually a plurality of article carriers or transport devices 2 for transporting the articles 13 along a path extending over the conveyor and for being raised and lowered to move the articles into and out of the workstations, as described below. Each of the transport devices 2 for products to be treated comprises a single frame formed part 10 having opposite laterally projecting edges 11 which are attached to respective supporting sections 14 beneath the respective edges 11. Each supporting section 14 is placed atop a respective continuous endless belt 6. The parts 10 provide support for and define a container 12 for the articles 13 to be treated.

There is an enclosing housing 20 for the system and a base frame 21 beneath the housing. The various elements described below are disposed in the housing 20.

FIG. 1 illustrates a housing 20 which includes a first driving unit 7 for driving the endless belts 6 of the conveyor and includes a second driving unit 9 for moving the entire conveyor 1 up and down in relation to the stations in the housing 20.

The driving unit 7 includes a motor 71, which is a standard geared motor from which a shaft 72 extends for driving a miter or bevel gear (not shown). The miter gear is connected to drive rollers, like 41, for each of the endless bands 6 of the conveyor. Therefore, operation of the motor 71 moves the endless bands 6 which moves the transport devices 2 on the path from left to right in FIG. 1 over the housing 20 of the apparatus. The driving unit 7 is mounted to a support 73 which is fixedly mounted to the conveyor 1, i.e. to the rails 4. Therefore, the driving unit 7 is moved together with the conveyor 1 up and down, by means of the below described second driving unit 9. Alternatively, the driving unit 7 may be of another known construction. For example, the motor for the driving unit may be mounted between the rails 4, and the drive roller would be driven via other gear means from that motor.

The lifting means 8, 9 for the entire conveyor comprises two cooperating conveyor lifting mechanisms 8, one near the entrance I and the other near the exit 11 of the apparatus and comprises a second driving unit 9 for operating the lifting mechanism.

The conveyor lifting mechanism 8 is generally comprised of two pairs or sets of guide bars 81 which are positioned near the entrance and exit ends of the path traveled by the conveyor. The two guide bars 81 are at both of their ends fixed in the housing 20. The lifting mechanism further comprises two supports 82, each for supporting a respective rail 4. The supporting beam 83 is fixed to both supports 82 and guiding means 84 are fixed to the supports 82 and to the supporting beam 83. The guiding means 84 are in sliding engagement with the guide bars 81, so that the supports 82 may be raised and lowered to move the transport devices with respect to the guide bars 81 which are anchored in the housing 20. The below described second driving unit 9 includes a mounting nut 96 which is fixedly mounted to the supporting beam 83.

The second driving unit 9 includes a geared motor 91 and two respective miter or bevel gears 92 supported on an elongate shaft 93 which is rotated by the motor 91 and is supported in the bearing block 94. Two respective threaded spindles 95 are threadedly received in the nuts 96 supported on the above described beams 83, such that operation of the motor 91 rotates the spindles 95. Because the nut 96 is fixed to the supporting beam, rotation of the shaft 93 and the spindles 95 raises and lowers the lifting device 8 which raises and lowers the rails 4 and thereby raises and lowers each of the transport devices 2 carried on the endless belts 6 running over the rails 4.

Figure 2:
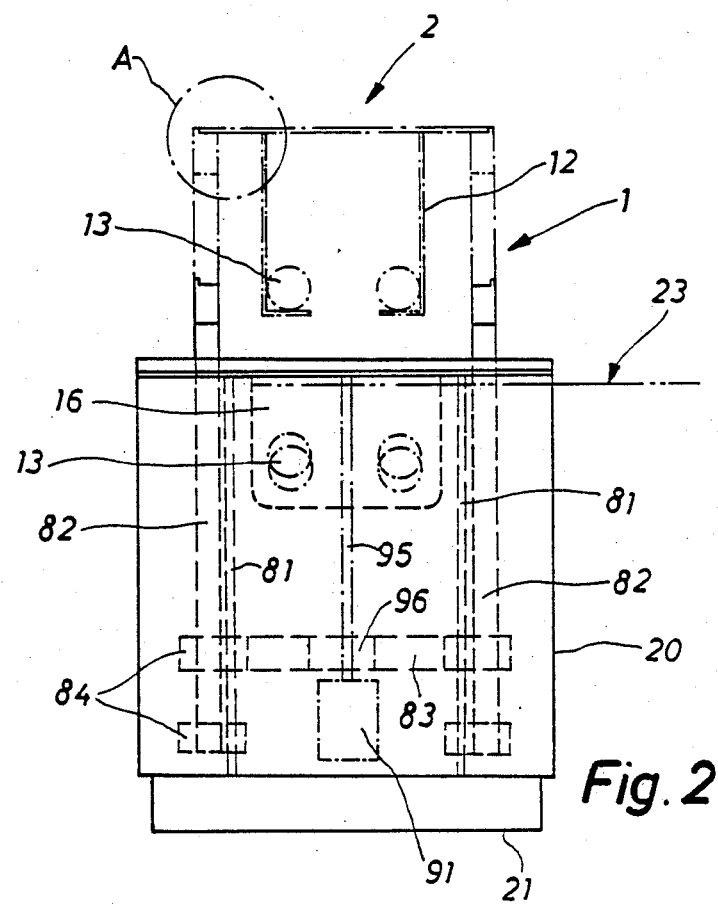
FIG. 2 is a side view of the apparatus of FIG. 1.
Figure 3:
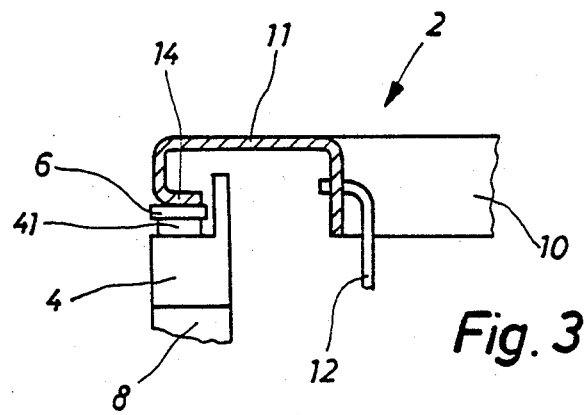
FIG. 3 is an enlarged detail A of FIG. 2.

With reference to FIG. 2, with the conveyor in the upraised position, it is at a predetermined height and holds the products 13 at a predetermined height above the stations 15, 16, 17, etc. The stations 16 may, for example, be vessels or vats filled with appropriate treating baths as the particular treatment process requires. In FIG. 2, the conveyor is normally always disposed above the bath level 23. Further, the rails 4 are laterally outward of the vats at the stations, so that the transport devices 2 may be lowered directly into the vats between the rails. In FIG. 2, the products 13 are shown both in the upraised, transport position and in the lowered positions in the vats.

The control unit 30 is connected with both of the first and the second driving units 7 and 9 for controlling conveyance of article transport devices 2 to the stations and for raising the devices 2 out of and lowering the devices 2 into the stations. Conventional regulating switching devices 32 may be provided on the rails or optical means 32, or the like, may be disposed at one or more of the workstations to be activated by the passing frame formed parts 10. The switching devices will transmit signals to the control unit 30 for controlling the article transport. When a transport device arrives at a particular workstation, a signal is sent by the device 32 to the control unit 30 to halt the first driving unit 7 and to commence operation of the second driving unit 9. The second driving unit 9 moves the entire conveyor down, holds it down for a preset period and then raises it up. Then the control unit 30 again operates the first driving unit 7 to move each article transport devices to the respective next consecutive station for treatment, and the process repeats continuously.

An individual transport device, with the articles included in it, may be placed onto the endless belt 6 in entrance region I which is upstream of the first station 15 in the path of the conveyor. After the conveying of each transport device and its raising and lowering through the various stations, the transport device with the articles in it may be removed from the endless belt 6 in the exit region II located downstream of the station 17. Appropriate means may automatically both apply and later remove the transport devices from the conveyor. Those means are well known and not illustrated.

In FIG. 1, the processing unit has a loading station 15, several article treatment stations 16 and an unloading station 17. The loading and unloading stations 15 and 17 are constructed to enable the article transport devices to be easily deposited on the endless bands 6 and to be removed therefrom. The loading station 15 receives one of the transport devices with the conveyor 1 lowered to the lower, working position, with the articles in the treatment stations. At that time, the conveyor bands 6 would be standing still and an article transport device 2 could be easily applied to and removed from the band. At the unloading station 17, the transport devices 2 are removed from the conveyor bands 6 also when the conveyor is lowered and is not moving. With the conveyor upraised and the bands and transport devices moving, placement and removal of an article transport device is more difficult, and accurate positioning at a station is extremely difficult. When a transport device reaches the first treatment station 16, a signal through a respective switching device 32 is transmitted to the control unit 30. This halts the first driving unit 7 and the conveyor 1 and activates the second driving unit 9 for lowering the conveyor to move the products into the treatment stations 16. After a set time period, the control unit causes the conveyor to be raised by the driving unit 9 and then causes the conveyor to be moved by the driving unit 7. Besides the simple downward and later upward movement of the conveyor, it is also possible to operate the second driving unit 9 to move the conveyor up and down repeatedly and rapidly for agitating the articles in the stations. Such up and down movement may be called "product movement".

Figure 4:
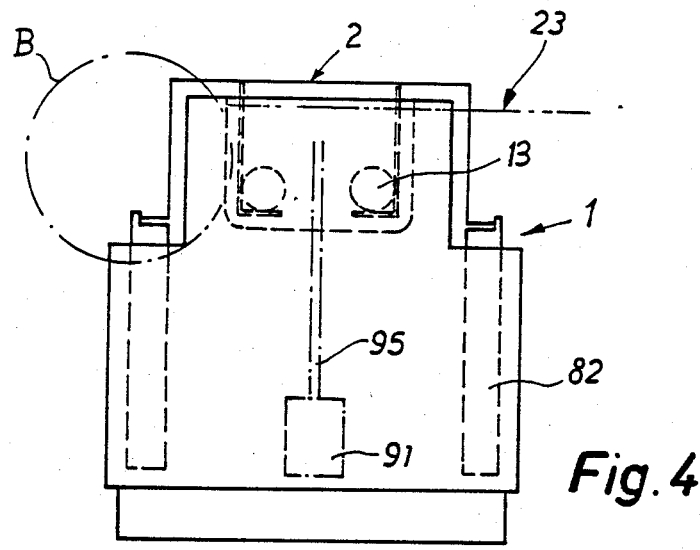
FIG. 4 is a side view of an alternate embodiment of transport apparatus.
Figure 5:
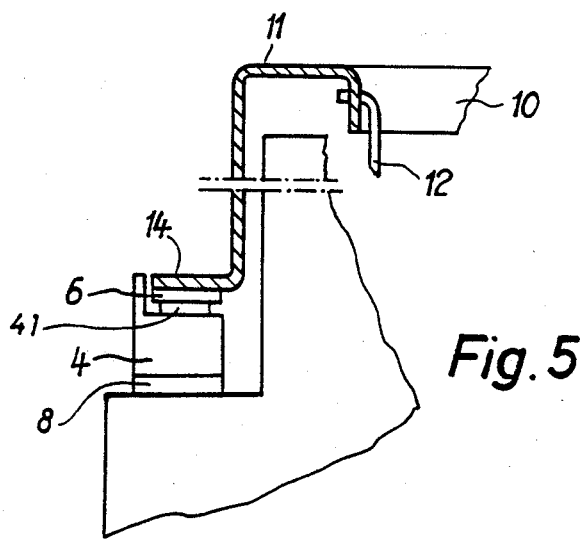
FIG. 5 is an enlarged detail B of the embodiment of FIG. 4.

The second embodiment of FIGS. 4 and 5 generally corresponds to the first embodiment, except that the transport devices 2, and the rails 4 and endless bands 6 are reconfigured and rearranged to be below the top of the vats and below the bath level 23 when they are in the upraised article conveying position, and to be lowered even further when the products are dipped into the vats at the various stations. In other respects, the structure and operation of the embodiment of FIGS. 4 and 5 are the same as the first embodiment. The second embodiment has the advantage that the elements associated with transport are below the top of the bath vats, which helps keep dirt necessarily generated by the transportation device components from falling into the vats.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A transport apparatus for automatically feeding articles to a number of consecutive stations for treatment at the stations, the apparatus comprising:
   at least one station, including a treatment station, arranged along a path, an entrance into the path and an exit from the path;
   at least one article transport device for being conveyed from the entrance past the stations to the exit;
   at least one conveyor extending from the entrance past the stations to the exit, the conveyor comprising a pair of substantially parallel, spaced apart rails laterally offset from the stations, each of said rails having an upright portion and a substantially flat portion, the rails providing a track for respective endless belts upon which the transport device is supported, the transport device being moved by the conveyor from the entrance past the stations to the exit; the conveyor and the transport device being shaped and located so that the transport device may be supported above the stations for conveyance past the stations and may be moved downward for the transport devices to be moved into the stations;
   a first driving unit for moving the conveyor for moving the transport devices from the entrance past the stations to the exit, the first driving unit being located below the stations;
   a lifting device connected with the conveyor for moving the conveyor up and down for thereby moving the transport devices then on the conveyor out of the stations and down into the stations; a second driving unit connected with the conveyor for moving the conveyor up and down, the second driving unit being located below the stations; and
   a control unit connected with the first and the second driving units for operating the conveyor to move a transport device from the entrance to each of the stations in turn and then to the exit, for operating the first driving unit to halt the operation of the conveyor when a transport device is at selected station, and for operating the second drive unit for moving the conveyor down to move the transport device down into the station when the transport device is at a selected station and for also moving the conveyor up to move the transport device up out of the station after a predetermined time interval.

2. The apparatus of claim 1 wherein there are a plurality of the transport devices and a plurality of the stations and the conveyor moves each of the transport devices in turn to selected ones of the stations and stops the conveyor with the transport devices at the selected stations.

3. The apparatus of claim 1, wherein the conveyor comprises a pair of parallel, spaced apart rails, the rails being connected to the lifting mechanism and the conveyor further comprises a respective band disposed on each of the rails and movable along the rail for defining the conveyor for the transport devices, each of the bands being accessible from above for receiving thereon the transport devices.

4. The apparatus of claim 3, wherein the transport device includes a frame like part having respective laterally projecting sections each for placement upon one of the bands supported on the rails, and further comprises a support for articles to be transported.

5. The apparatus of claim 3, wherein at least one of the stations comprises a vat for containing a bath, the bath having a level and the bands of the conveyor are disposed below the bath level.

6. The apparatus of claim 3, wherein at least one of the stations comprises a vat for containing a bath, the bath having a level and the bands of the conveyor are disposed above the bath level.

7. The apparatus of claim 1, further comprising sensors connected with the control unit for sensing the positions of the transport devices and for operating the first driving unit for halting the conveyor with the transport devices at particular locations with respect to the stations.

8. The apparatus of claim 1, wherein the first and second driving units define a common unit.

9. The apparatus of claim 1, wherein each transport device includes a frame like part and includes laterally projecting sections for being disposed on the conveyor and further includes a support for articles to be transported.

10. The apparatus of claim 1, wherein at least one of the stations comprises a vat for containing a bath.

11. The apparatus of claim 10, wherein the conveyor is disposed below the level the bath in the vat and the transport device is supported above the vat.

12. The apparatus of claim 10, wherein the conveyor is disposed above the level the bath in the vat.

13. The apparatus of claim 10, further comprising a common housing in which the first and second driving units and the bath vats are disposed.

14. The apparatus of claim 1, further comprising a common housing in which the first and second driving units and the stations are disposed.

15. The apparatus of claim 1, further comprising a plurality of the conveyors next to one another and a plurality of the vats, with respective article transport devices being received in respective ones of the vats.

* * * * *